United States Patent
Levi et al.

(10) Patent No.: US 10,750,897 B2
(45) Date of Patent: Aug. 25, 2020

(54) DEVICE FOR EXTRACTING A SUBSTANCE TO BE BREWED

(71) Applicant: UNIC, Carros (FR)

(72) Inventors: Jean-Pierre Levi, Nice (FR); Mario Levi, Nice (FR)

(73) Assignee: UNIC, Carros (FR)

( * ) Notice: Subject to any disclaimer, the term of this patent is extended or adjusted under 35 U.S.C. 154(b) by 912 days.

(21) Appl. No.: 15/305,512

(22) PCT Filed: Apr. 21, 2015

(86) PCT No.: PCT/EP2015/058619
§ 371 (c)(1),
(2) Date: Oct. 20, 2016

(87) PCT Pub. No.: WO2015/162139
PCT Pub. Date: Oct. 29, 2015

(65) Prior Publication Data
US 2017/0042367 A1    Feb. 16, 2017

(30) Foreign Application Priority Data

Apr. 22, 2014    (FR) ...................................... 14 53607

(51) Int. Cl.
*A47J 31/36* (2006.01)
*A47J 31/44* (2006.01)

(52) U.S. Cl.
CPC ....... *A47J 31/3633* (2013.01); *A47J 31/3638* (2013.01); *A47J 31/3676* (2013.01);
(Continued)

(58) Field of Classification Search
CPC ................ A47J 31/3633; A47J 31/3638; A47J 31/3676; A47J 31/446; A47J 31/4467; A47J 31/4471
(Continued)

(56) References Cited

U.S. PATENT DOCUMENTS

2004/0094040 A1    5/2004  Sachtleben
2006/0144243 A1    7/2006  Levi et al.
(Continued)

FOREIGN PATENT DOCUMENTS

EP    1418135    5/2007
EP    1 778 063    10/2008
(Continued)

OTHER PUBLICATIONS

International Search Report for corresponding International PCT application No. PCT/EP2015/058619, dated Jun. 17, 2015.

*Primary Examiner* — Dana Ross
*Assistant Examiner* — James F Sims, III
(74) *Attorney, Agent, or Firm* — Hauptman Ham, LLP (57) ABSTRACT

A device for extracting a substance to be brewed comprising: an extraction compartment in a first and a second portion, movable relative to the first portion to switch the compartment between a closed position and an open position; a linking device between the first and the second portion, comprising a holder with a first link so configured as to produce a rotation of the holder relative to the first portion, and a second link relative to the second portion, and the device comprises an articulation joint so configured as to successively produce, during a rotational motion of the holder about the first link in a first direction of rotation, a first tilting of the second portion in the first direction, then a second tilting of the second portion in a second direction opposite the first direction.

20 Claims, 7 Drawing Sheets

(52) U.S. Cl.
CPC ......... *A47J 31/446* (2013.01); *A47J 31/4467* (2013.01); *A47J 31/4471* (2013.01)

(58) Field of Classification Search
USPC .................................................. 99/295, 320
See application file for complete search history.

(56) References Cited

U.S. PATENT DOCUMENTS

| | | |
|---|---|---|
| 2008/0121111 A1 | 5/2008 | Paget et al. |
| 2009/0199720 A1 | 8/2009 | Levi et al. |
| 2011/0197771 A1 | 8/2011 | Bolzicco et al. |
| 2015/0164262 A1* | 6/2015 | Dingle ................ A47J 31/3633 99/295 |

FOREIGN PATENT DOCUMENTS

| | | |
|---|---|---|
| EP | 2 020 891 | 8/2009 |
| EP | 2 356 928 | 8/2011 |
| EP | 2 046 173 | 1/2014 |
| EP | 2 621 317 | 4/2014 |
| FR | 2886121 | 5/2005 |
| GB | 2 499 005 | 8/2013 |
| WO | 2007/016977 | 2/2007 |

\* cited by examiner

DEVICE FOR EXTRACTING A SUBSTANCE TO BE BREWED

FIELD OF THE INVENTION

The present invention relates to a device for extracting a substance to be brewed as well as a machine for producing beverages. A preferred application is the production of beverages from ground coffee, and more particularly when said ground coffee is packaged in pods.

TECHNOLOGICAL BACKGROUND

Using coffee machines generally requires several operations by a user, among which the filling of an extraction chamber with ground coffee, the closing of the chamber in a position so that it is ready to receive hot water injection, then, when brewing is completed, the emptying of the used ground coffee.

The marketing of ground coffee-containing packagings substantially improved such operations by limiting or even eliminating any contact between the ground coffee and the coffee machine. The phases of filling and emptying the extraction chamber are more particularly facilitated.

In some cases, coffee is packaged in tight pods, so that coffee is brewed inside the pod, and the machine now simply has a receptacle for the pod, a system for injecting hot water through one face of the pod, and a duct for dispensing beverage, through another, opposite, face of the pod.

Despite such improvements, the phases of opening and closing the extraction chamber are still complex. To remedy this problem, document WO-A1-2007/137937 provides for a device, wherein the brewing chamber(s) is/are formed in two mutually movable portions. An upper stationary portion covers the brewing chamber and can be added onto a coffee machine. Another lower portion moves along a kinematic characteristic to open the brewing chamber, lower the second portion and then cause the tilting of the second portion towards the front of the machine. The filling and the emptying of the brewing chamber are facilitated from the front face of the machine when such technique is used.

A need exists however for a further improvement of the operation phases of such a device to make the filling and the emptying of the extraction chamber more practical.

SUMMARY OF THE INVENTION

A first aspect of the invention discloses a device for extracting a substance to be brewed, comprising: an extraction compartment formed in a first portion and a second portion, with the second portion being movable relative to the first portion so that the compartment switches between a closed position and an open position and a linking device between the first portion and the second portion, comprising a holder with a first kinematic link so configured as to produce a rotational motion of the holder relative to the first portion, and a second kinematic link relative to the second portion.

Advantageously, the linking device comprises an articulation joint so configured as to successively produce, upon a rotational motion of the holder about the first kinematic link in a first direction of rotation, from the closed position of the compartment, a first tilting motion of the second portion in the first direction of rotation, then a second tilting motion of the second portion in a second direction of rotation opposite the first direction.

The invention thus provides a sequence of two positions enabling the emptying and then the filling, with only one motion of the user.

According to another aspect, a machine for producing beverages by brewing a substance, comprising a device as described above, is described here.

Other aspects relate to a method for extracting a substance to be brewed.

DESCRIPTION OF THE DRAWINGS

The appended drawings are given as examples only and are not restrictive to the invention. They only show one embodiment of the invention and will facilitate the understanding thereof.

DETAILED DESCRIPTION

Prior to going into details of the embodiments of the invention, more particularly while referring to the drawings, possible options for the invention are introduced hereafter; they are not restrictive and can be implemented separately or in any combinations thereof.

- the articulation joint comprises a cam 21, a first end 22 of which is rotationally mounted through a first link joint 18 relative to the first portion 1, and a second end 23 of which is rotationally mounted through a second link joint 27 relative to the second portion 2
- the second link joint 27 of the cam 21 is braked and the articulation joint comprises a limiter so arranged as to stop the angular movement of the cam 21 with the rotational motion of the holder 8, with an angular movement of the cam 21 being caused by the rotational motion of the holder 8, with a motion of the cam 21 after the action of the limiter being so configured as to produce the second tilting motion;
- the cam 21 comprises a body 24 having a convex profile between the first and the second end 22, 23 thereof, with the body 24 comprising a stop 26 so arranged as to cooperate with an complementary stop 17 to form the limiter;
- the complementary stop 17 and the first link joint 18 of the cam 21 are carried by a flank section 14 which is stationary relative to the first portion 1.
- the articulation joint is so configured as to produce a third tilting motion of the second portion 2, after the second tilting, during a rotational motion of the holder 8 about the first kinematic link 9 in the second direction of rotation 40, with the third tilting being in the second direction of rotation 40;
- it comprises a system for stopping the first portion 1 and the second portion 2 in a relative position thereof after the third tilting motion;

- the stopping system comprises a stop 45 carried by the second portion 2 and a stopping surface integral with the first portion 1;
- the articulation joint is so configured as to produce a fourth tilting motion of the second portion 2 in the first direction of rotation 39, during a rotational motion of the holder 8 about the first kinematic link 9 in the second direction of rotation 40;
- the first kinematic link 9 is a pin;
- the first kinematic link 9 is a horizontal axis pin;
- the holder 8 comprises a lever 37 provided with a grip (38) handle;
- the rotational motion of the holder 8 is so oriented as to lift the grip (38) handle;
- the second articulation joint is a sliding pin.
- the device comprises a second holder and a second linking device, with the second holder and the second linking device being positioned on one side of the device opposite the side of the device where the holder and the linking device are positioned;
- the compartment 4 is so configured as to receive one pod 35 packaging the substance to be brewed;
- the compartment 4 comprises, at a rear face 6 of the second portion 2, an opening so arranged as to enable a pod 35 to fall by gravity upon completion of the first tilting motion;
- the compartment 4 comprises a longitudinal vertical axis in the closed position;
- the device comprises at least an additional compartment.

The drawings show an application of the invention to a coffee machine with water injection in a vertical direction. Besides, the drawings refer to the use of pods wherein brewing takes place. The machine shown in FIG. 1 for instance, thus comprises a device connected through an interface 3 to the rest of the machine and liable to simultaneously receive two pods.

Figure 1:
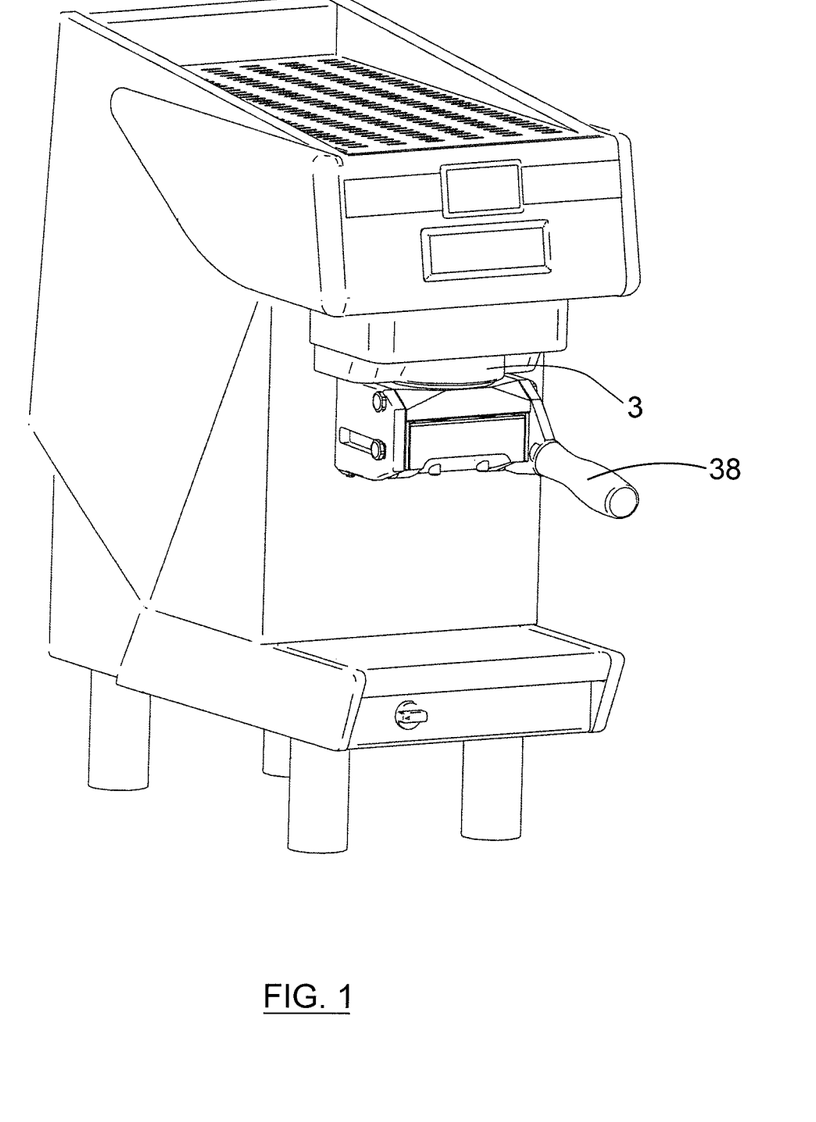
FIG. 1 is a perspective view of a machine of the invention.
Figure 2:
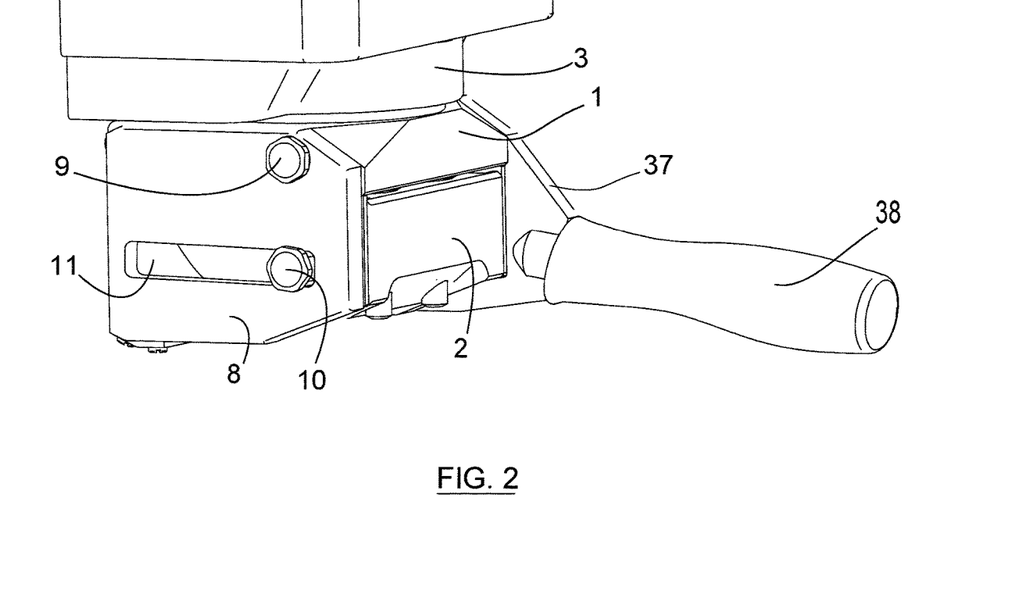
FIG. 2 shows, in the closed position, one embodiment of the is extraction device.
Figure 3:
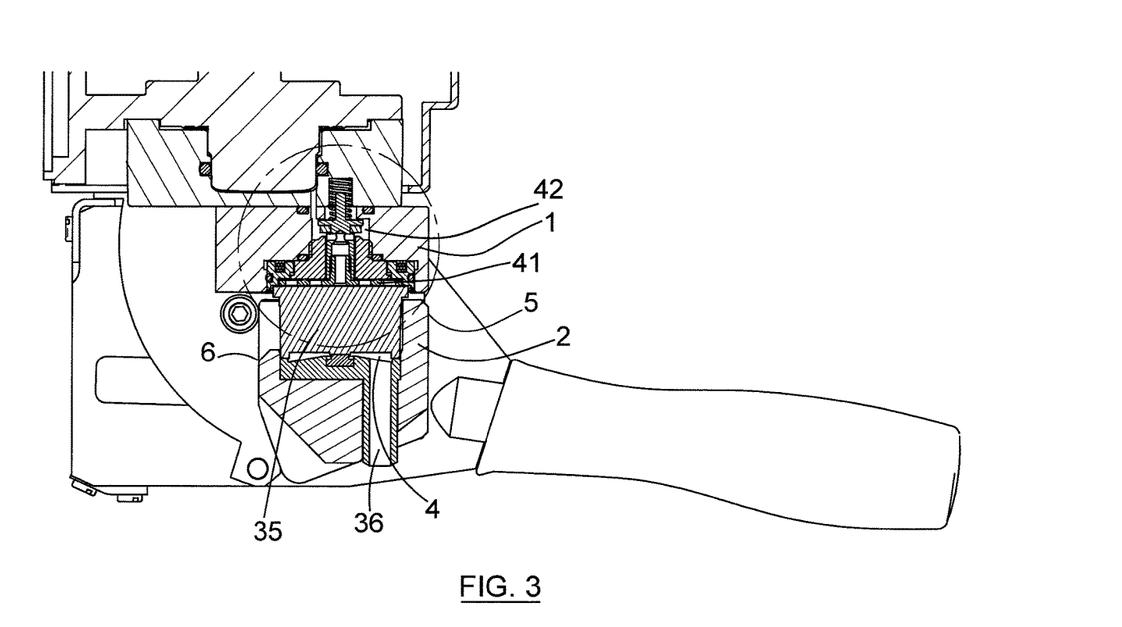
FIG. 3 is a sectional view, opening a vertical plane, of the device in the closed position.

FIG. 1 further shows that, in an advantageous case, handling operations are performed using a single handle 38, from the front of the machine. It cannot be excluded that a machine could comprise several extraction devices and/or comprise motorization means instead of the handle 38. The FIGS. 2 and 3 more particularly show that the device comprises two portions 1 and 2. The first portion 1 is preferably stationary relative to the rest of the machine which it is interfaced with. The second portion 2, here below the first portion 1, is movable relative thereto. The second portion 2 comprises one or more cavities, each able to receive a pod 35 in the illustrated case or directly ground coffee. Each cavity forms a portion of a compartment 4, another portion of which is provided in the first portion 1. In the figures, the portion 1 closes the compartments 4, at the opening of the cavities in the second portion 2.

The first portion 1 advantageously comprises a device 42 for injecting hot water into the ground coffee to be brewed. Such device 42 is positioned in the circled zone in FIG. 3 and comprising for example: a water injection channel, a valve opening the channel if a pod is present, sealing elements and a spray tube 41 applicable above the pod 35 in this particular case. Depending on the pod technology, additional means, more particularly for piercing the upper face of the pod 35, can be implemented.

In the lower portion, the compartment 4 comprises a beverage output channel 36.

The compartment 4 preferably further comprises an opening, at a rear face 6 of the second portion 2. The cavity is notched there, so as to cooperate with a limited portion of the pod 35 only. More particularly, the opening is limited upwards by a rim 43 used to stop the pod 35 during a limited inclination of the compartment 4. However, if the inclination of the compartment 4 towards the rear face 6 exceeds a certain angular value, the pod 35 is tilted beyond the rim 43 and falls down under the effect of gravity.

Figures 7, 8:
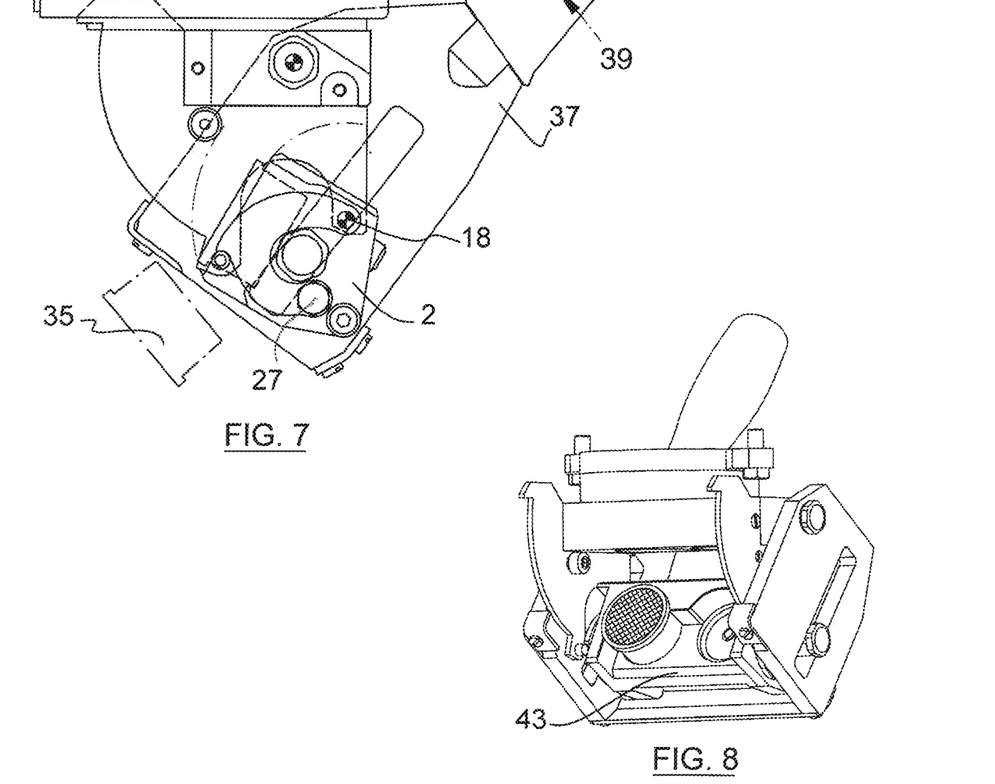
Figure 11:
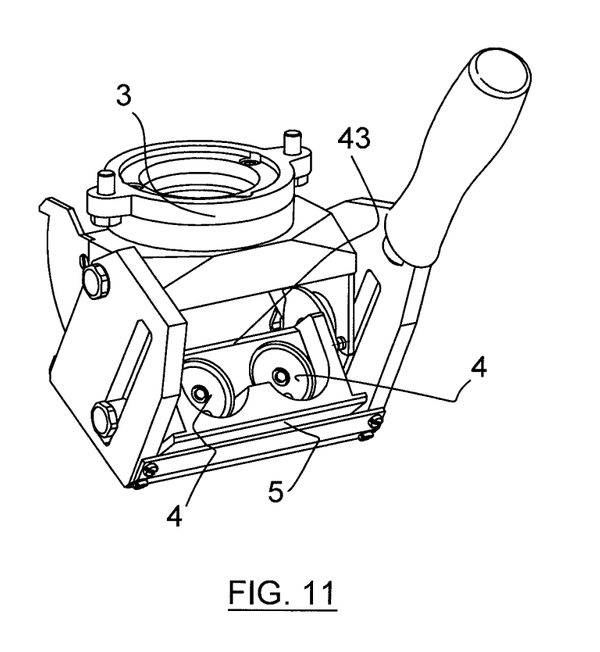

FIGS. 8 and 11 show that the rim 43 may be common to several compartments 4. The height thereof is further preferably limited and is advantageously positioned below the position of the centre of gravity of the pod 35, to cause the fall thereof by tilting.

It should be understood that the position of the second portion 2 affects the operation phases. Tilting, as mentioned above, thus makes it possible to eject the pod 35. Besides, a tilting in an opposite direction ensures an easy positioning for the filling. The invention makes it possible to sequence such phases during a rotational motion, in only one direction for the handle 38, while causing two tiltings of the second portion 2 in opposite directions. The ejection of the pod 35 through the rear face, then the return to the filling position, towards the front face 5, can thus be obtained with the same motion of the user. An advantage more particularly consists in receiving the used pods at the rear of the machine and not directly at the front thereof.

For this purpose, the device implements a characteristic kinematics, an example of which is disclosed hereinunder. The structural drawing in the figures is not restrictive, but gives an example of a linking device, connecting the first portion 1 and the second portion 2, while providing the desired mobility.

Figure 4:
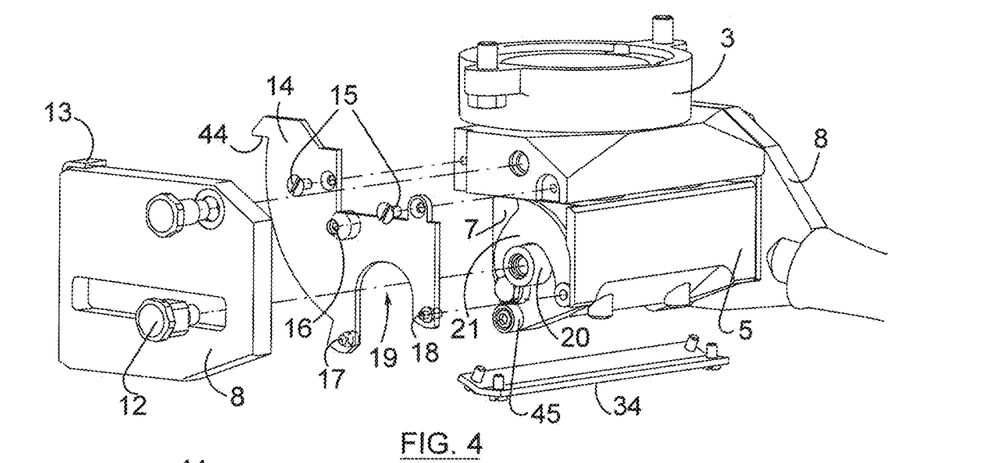
FIG. 4 is an exploded view in perspective showing one embodiment of the linking device of the invention, between two portions of the extraction device.

A first portion of the linking device comprises at least a holder 8 (two in the figures, each one being on an opposite side 7 of the second portion 2), for example as a plane part added to the side 7 of the second portion. The holder 8 is articulated on the first portion 1 by a first kinematic link 9. FIG. 4 shows one embodiment thereof with a screw which can be fixed into the first portion 1 and preserving a bearing to cooperate with a hole in the holder 8. The holder 8 is also connected to the second portion 2, by a second kinematic link 10. In the case of the figures, the hole 11 in the holder 8 is elongated, which enables the translational displacement of an axis 12 so mounted as to rotate through a portion screwed on a shaft 20 formed in the second portion 2. This forms a sliding pin.

Advantageously, a holder 8 is integral with a portion of a lever 37 ending in a handle 38 to drive the holder 8 into rotation relative to the first portion 1.

In the case where a pair of holders 8 is provided, which is advantageous to balance the device, the holders 8 are made integral with each other, for example via a cross connector 34.

The linking device comprises other means for executing the phases of tilting of the second portion 2. FIG. 4 thus illustrates a cam 21, here as a convex body 24 with a first end 22, towards the front face 5, which is so mounted as to pivot relative to the first portion 1, through a first link joint 18. A second end 23 of the cam 21 is positioned closer to the rear face 6 and is the position of a second link joint 27 between the cam 21 and the second portion 2.

Advantageously, a flank section 14 is added onto the first portion 1 specifically to receive the first link joint 18. The flank section 14 is for example a plate made integral with the first portion 1 using screws 15.

The flank section 14 can also receive a guiding pin 16, a stop 17 or a stopping block 44 as explained later in the description.

It should be understood that the thus mounted cam 21 provides a second link between the first and the second portions 1, 2, in addition to the articulation joint consisting of the first and second kinematic links 9, 10. This makes it possible to sequence the relative motions of the first and second portions 1, 2 as explained in greater details while referring to FIGS. 5 to 13. It should be noted, beforehand, that the second link joint 27 is advantageously braked, i.e. that a predetermined friction level has to be overcome to operate it and pivot it there. FIG. 14 shows a possible embodiment with a cavity 32 in the second portion 2 receiving a screw 28 fixed at the bottom of the cavity 32 in a threaded hole. The screw 28 has a section cooperating with a hole in the cam 21. A part of the bearing 29 is preferably inserted there for guiding the cam 21 in rotation. A spring 31 is mounted in the cavity 12, and surrounds the screw, so as to resiliently rest on a washer 30 so configured as to frictionally apply to a face of the cam 21 so as to produce resistance upon the rotational motion about the bearing 29.

Figure 5:
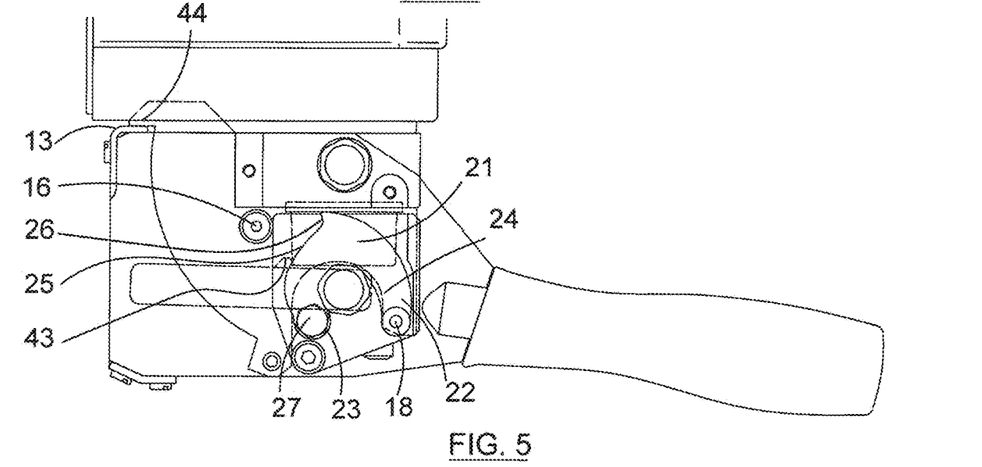
FIGS. 5 to 13 show successive operation phases of the device from a closed position, and then returning to the closed position.

An example of operation is described from a situation in which the compartment 4 is formed, as is the case in FIG. 5. In this figure, the handle 38 is lowered and the holder 8 rests on the stopping block 44 of the flank section 14, through a bearing surface 13. The faces opposite the first and second portions 1, 2 are substantially parallel and close to one another, so as to close the compartment 4. Brewing can be carried in such configuration.

Figure 6:
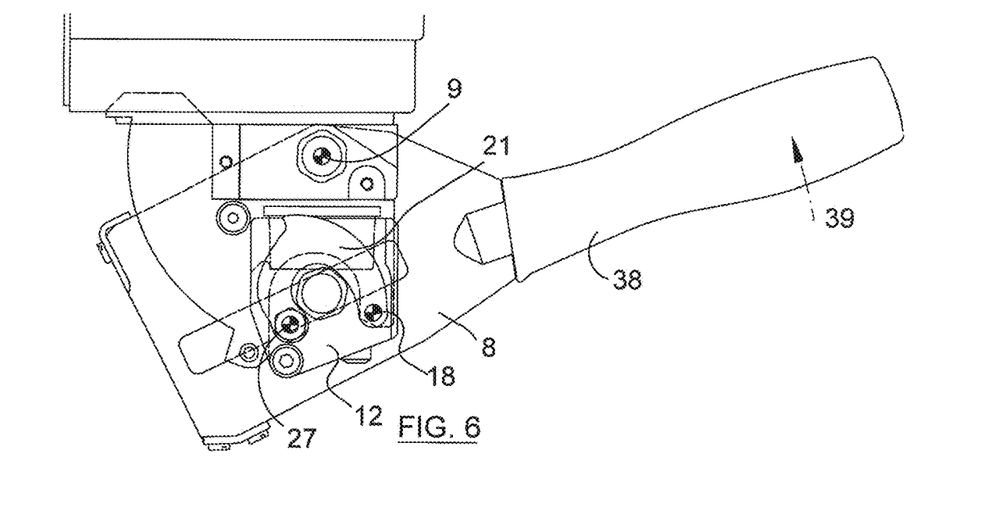

Further to the motion of the handle 38, here upwards, in a direction of rotation 39, FIG. 6 shows a subsequent phase opening the compartment 4 by moving the portions 1 and 2 away. Lifting the handle 38 causes rotation about the link 9. The screw 12 gradually moves into the hole 11.

However, the first portion 1 does not pivot at this stage since its rotation is blocked by the guiding pin 36, against which its rear surface 6 applies, so that the mobility of the second portion 2 is then mainly a vertical translation. The links 18 and 27 are not much or even not at all operated.

The continuation of the handle 38 rotation causes the second portion 2 to disengage from the pin 36 and moves the cam 21 about the link 18. As the link 27 is braked, it remains stationary. The second portion 2 can then follow the rotational motion of the handle 38 and perform a first tilting motion rearwards, in the first direction of rotation 39. Such tilting motion reaches an angular movement of the second portion 2 which is sufficient for the pod(s) 35 to be released from the compartment(s) 8, as shown in FIG. 7. FIG. 8 shows, in perspective the steep slope of the second portion 2 which causes the fall.

In the configuration of FIG. 7 and of FIG. 8, the first tilting motion does not go on. As a matter of fact, upon completion of this phase, the cam 21 is stopped by another stop 17 which is additional to the stop 26 positioned on the cam 21. Specifically, in the illustrated case, the cam 21 comprises a notch 19 about the shaft 20, with the stop 26 protruding relative to a recess 25 on the rim of the cam 21.

Figure 9:
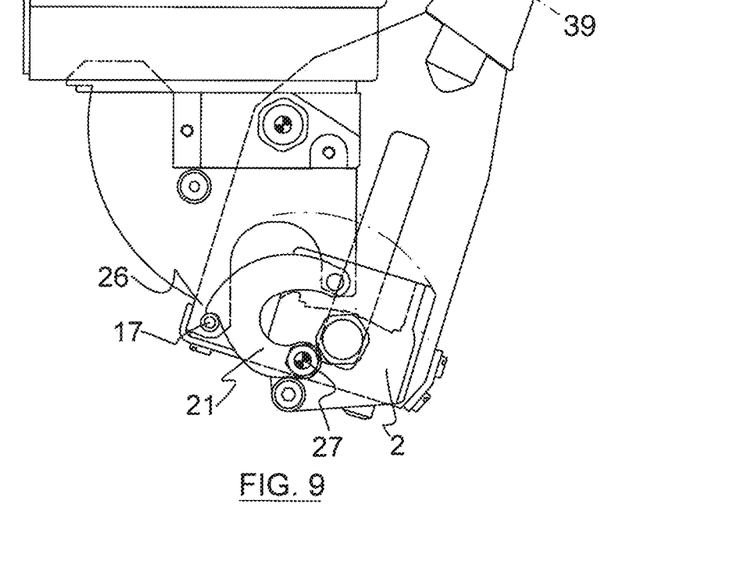

FIG. 9 shows that, due to the cam 21 being stopped, the continuation of the rotation of the handle 38 forces the pivot of the second link 27 to move. This causes the second portion 2 to be lifted, in a second tilting motion, in the opposite direction, i.e. in the direction 40 shown in FIG. 10. Upon completion of the lifting of the handle 38, the second kinematic link 10 reaches its travel limit and the motion cannot go on. However, the second portion 2 has already been redirected towards the front of the machine then.

Figure 10:
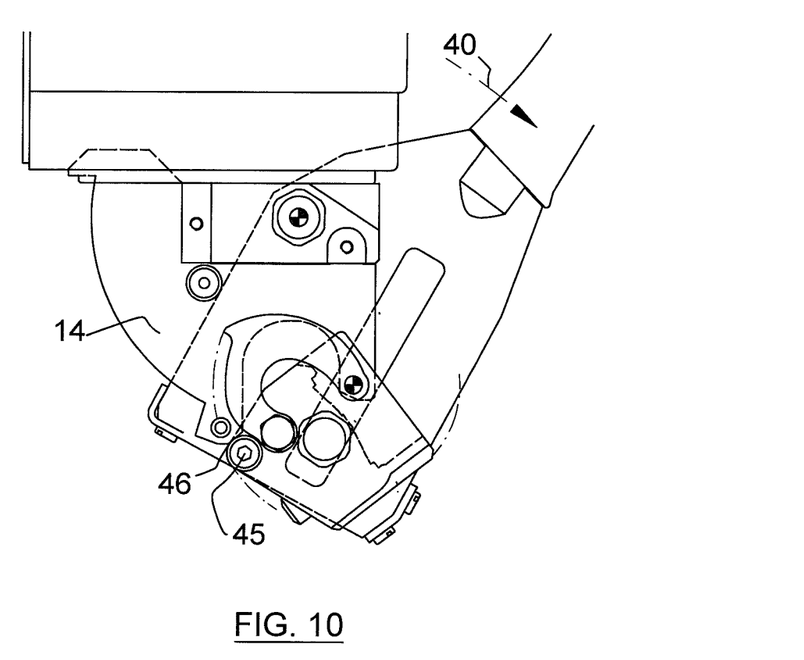

Then, as shown in FIGS. 10 and 11, a reverse rotation of the handle 38 (and thus of the holder 8) for example further to a simple release by the user, in the direction 40, makes the handle 38 go down to an intermediate position for awaiting the filling with the pod 35. Such situation is stable since a stop 45 integral with the second portion 2 rests on a stopping block formed on the flank section 14. As the link 27 is braked, such down motion extends to the second portion in the direction 40 so that the compartment 4 is, upon completion of the third tilting motion, wide open towards the front face 5 as shown in FIG. 11.

Figure 12:
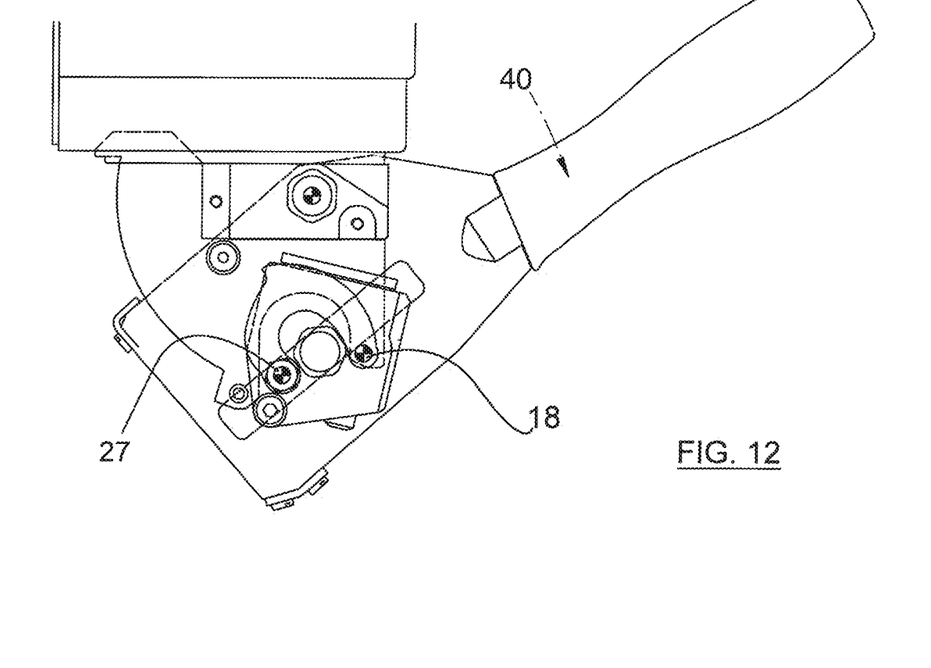

A slight additional effort from the user to lower the handle 38 releases the stop 45 and causes a fourth tilting motion of the second portion 2, by operating the first and second link joints 18 and 27, as illustrated in FIG. 12.

Figure 13:
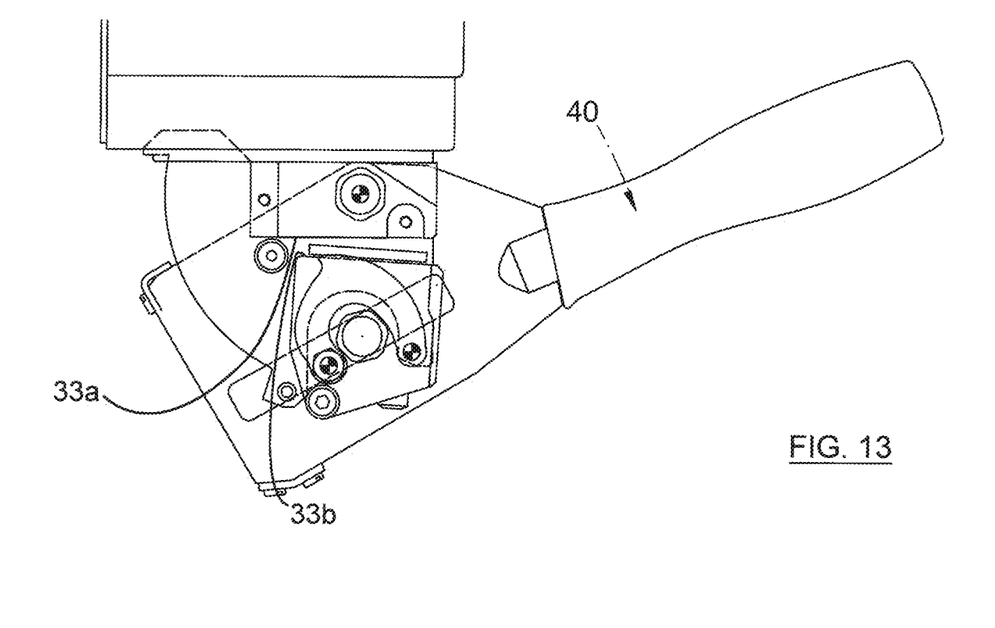
Figure 14:
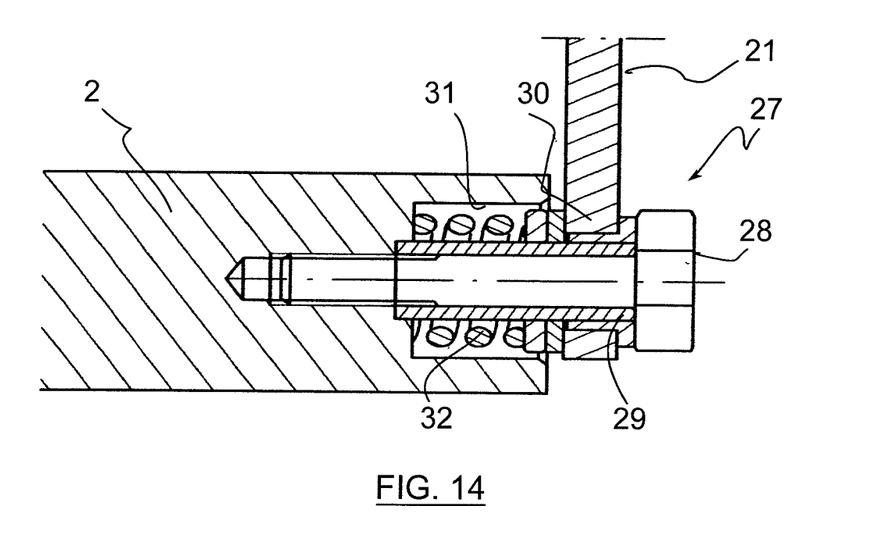
FIG. 14 shows a portion of one embodiment of the invention, with a braked link.

Such motion goes on until it returns to the closed position, according to the motion of FIG. 13, until the configuration of FIG. 5 is reached, wherein the faces 33*a* and 33*b* of the portions 1 and 2 come in contact with each other.

REFERENCES

1. First portion
2. Second portion
3. Interface
4. Compartment
5. Front face
6. Rear face
7. Side
8. Holder
9. First kinematic link
10. Second kinematic link
11. Elongated hole
12. Pivot axis
13. Bearing surface
14. Flank section
15. Screw
16. Guiding pin
17. Complementary stop
18. First link joint
19. Notch
20. Shaft
21. Cam
22. First end
23. Second end
24. Convex body
25. Recess
26. Stop
27. Second link joint
28. Screw
29. Bearing
30. Brake washer
31. Spring
32. Cavity
33*a*, 33*b*. Contact face
34. Cross connector
35. Pod
36. Output channel
37. Lever
38. Handle
39. First direction of rotation
40. Second direction of rotation
41. Spray tube
42. Water injection system
43. Rim
44. Stopping block
45. Stop
46. Stopping block

The invention claimed is:
1. A device for extracting a substance to be brewed, comprising:

an extraction compartment formed in a first portion and a second portion, the second portion being movable relative to the first portion so as to switch the compartment between a closed position and an open position; and a linking device linking the first portion and the second portion together, comprising a holder with a first kinematic link configured to produce a rotational motion of the holder relative to the first portion, and a second kinematic link configured to produce the rotational motion of the holder relative to the second portion, wherein the linking device comprises an articulation joint configured to successively produce, upon the rotational motion of the holder about the first kinematic link in a first direction of rotation, from the closed position of the compartment, a first tilting motion of the second portion in the first direction of rotation, then a second tilting motion of the second portion in a second direction of rotation opposite the first direction.

2. The device according to claim 1, wherein the articulation joint comprises a cam, a first end of which is rotationally mounted through a first link joint relative to the first portion, and a second end of which is rotationally mounted through a second link joint relative to the second portion.

3. The device according to claim 2, wherein the second link joint of the cam is braked and wherein the articulation joint comprises a limiter so arranged as to stop an angular movement of the cam with the rotational motion of the holder, the angular movement of the cam driven by the rotational motion of the holder forming the first tilting motion, a motion of the cam after the action of the limiter being so configured as to produce the second tilting motion.

4. The device according to claim 3, wherein the cam comprises a body having a convex profile between the first and the second end thereof, and the body comprising a stop so arranged as to cooperate with a complementary stop to form the limiter.

5. The device according to claim 4, wherein the complementary stop and the first link joint of the cam are carried by a flank section which is stationary relative to the first portion.

6. The device according to claim 1, wherein the articulation joint is so configured as to produce a third tilting motion of the second portion, after the second tilting, during a rotational motion of the holder about the first kinematic link in the second direction of rotation, the third tilting being in the second direction of rotation.

7. The device according to claim 6, comprising a system for stopping the first portion and the second portion in a relative position thereof after the third tilting motion.

8. The device according to claim 7, wherein the stopping system comprises a stop carried by the second portion and a stopping surface integral with the first portion.

9. The device according to claim 6, wherein the articulation joint is so configured as to produce a fourth tilting motion of the second portion in the first direction of rotation, during a rotational motion of the holder about the first kinematic link in the second direction of rotation.

10. The device according to claim 1, wherein the first kinematic link is a pin.

11. The device according to claim 10, wherein the first kinematic link is a horizontal axis pin.

12. The device according to claim 11, wherein the holder comprises a lever provided with a grip handle.

13. The device according to claim 12, wherein the rotational motion of the holder is so oriented as to lift the grip handle.

14. The device according to claim 1, wherein the second articulation joint is a sliding pin.

15. The device according to claim 1, further comprising a second holder and a second linking device, the second holder and the second linking device being positioned on one side of the device opposite a side of the device whereon the holder and the linking device are positioned.

16. The device according to claim 1, wherein the compartment is so configured as to receive a pod packaging the substance to be brewed.

17. The device according to claim 16, wherein the compartment comprises, at a rear face of the second portion, an opening so arranged as to enable the pod to fall by gravity upon completion of the first tilting motion.

18. The device according to claim 1, wherein the compartment comprises a longitudinal vertical axis in the closed position.

19. The device according to claim 1, further comprising at least an additional compartment.

20. The machine for producing beverages by brewing a substance, comprising a device including:

an extraction compartment formed in a first portion and a second portion, the second portion being movable relative to the first portion so as to switch the compartment between a closed position and an open position; and a linking device linking the first portion and the second portion together, comprising a holder with a first kinematic link configured to produce a rotational motion of the holder relative to the first portion, and a second kinematic link configured to produce the rotational motion of the holder relative to the second portion, wherein the linking device comprises an articulation joint configured to successively produce, upon the rotational motion of the holder about the first kinematic link in a first direction of rotation, from the closed position of the compartment, a first tilting motion of the second portion in the first direction of rotation, then a second tilting motion of the second portion in a second direction of rotation opposite the first direction.

* * * * *